United States Patent [19]

Dougherty

[11] Patent Number: 4,550,360

[45] Date of Patent: Oct. 29, 1985

[54] CIRCUIT BREAKER STATIC TRIP UNIT HAVING AUTOMATIC CIRCUIT TRIMMING

[75] Inventor: John J. Dougherty, Avon, Conn.

[73] Assignee: General Electric Company, New York, N.Y.

[21] Appl. No.: 612,508

[22] Filed: May 21, 1984

[51] Int. Cl.[4] .............................................. H02H 3/16
[52] U.S. Cl. ........................................ 361/93; 361/96; 364/483
[58] Field of Search .................... 361/93, 96, 97, 98, 361/159; 364/483

[56] References Cited

U.S. PATENT DOCUMENTS

| 3,922,587 | 11/1975 | Jones ................................... 361/159 |
| 4,271,444 | 6/1981 | Howell ............................... 361/96 X |
| 4,297,741 | 10/1981 | Howell ................................ 361/93 |
| 4,454,557 | 6/1984 | Hurley ................................ 361/93 |

*Primary Examiner*—Harry E. Moose, Jr.

*Attorney, Agent, or Firm*—Richard A. Menelly; Walter C. Bernkopf; Fred Jacob

[57] ABSTRACT

An analog signal processor used within a static trip unit is provided with an A/D converter, a digital processor and an electrically alterable non-volatile memory (EAROM) for providing trimming and calibration facility to the trip unit. The EAROM provides the ability to store parameters calculated by the user during the manufacturing process of the trip unit. Key measured or environmental variables are created and a correction algorithm is generated and stored along with data. The trip unit is then capable of self-calibration by applying the correction factor to compensate for variations in the component sensitivity. In one application, the current sensing transformer is precalibrated and provided with a correction factor and a correction algorithm. In another application, the thick film resistors within the long term trip mode network, the short term trip mode network and the power supply voltage regulator are "trimmed" by means of stored correction values.

21 Claims, 4 Drawing Figures

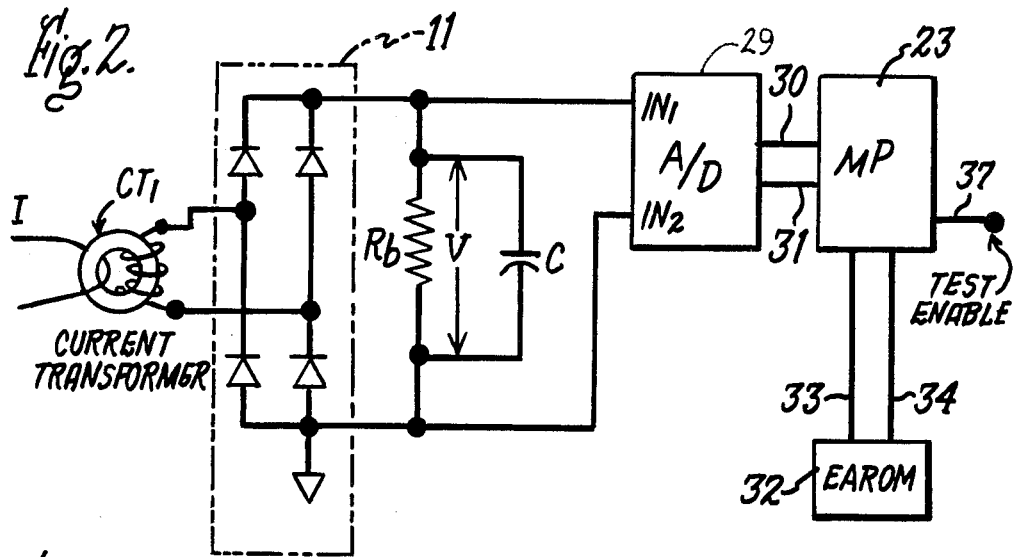
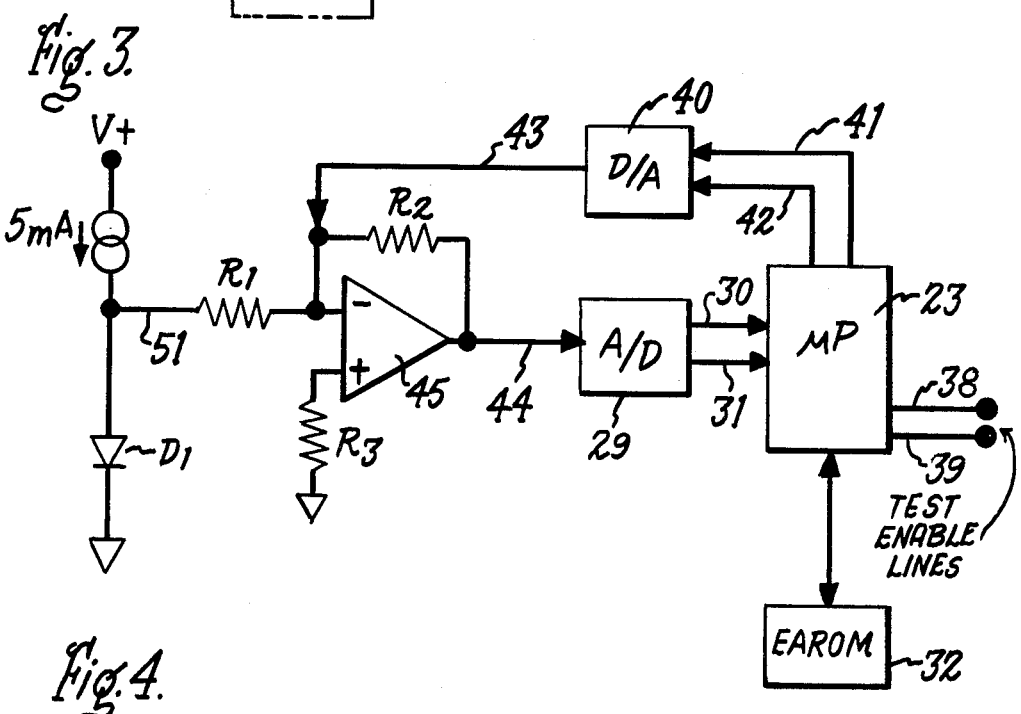
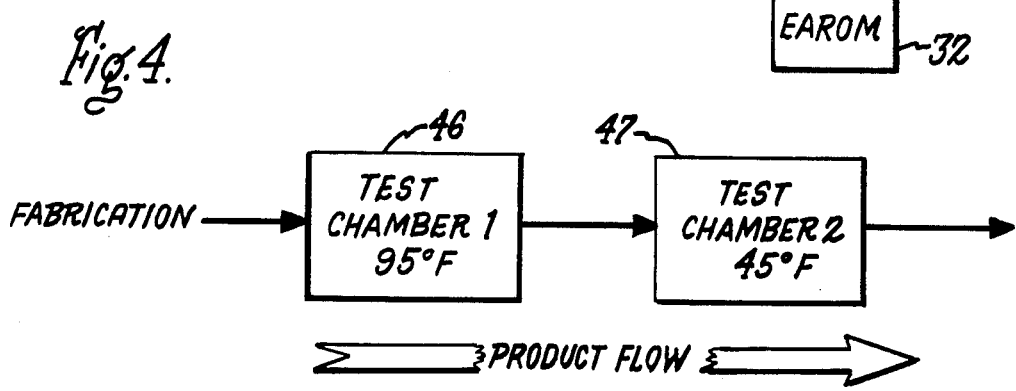

CIRCUIT BREAKER STATIC TRIP UNIT HAVING AUTOMATIC CIRCUIT TRIMMING

BACKGROUND OF THE INVENTION

This invention relates to static trip circuit interrupters in general, and in particular, to those type interrupters employing current transformers for both sensing current magnitudes through a protected circuit as well as for providing operating power to the static trip circuit interrupter components. One such circuit is described within U.S. Pat. No. 4,266,259 to E. K. Howell, which patent is incorporated herein for purposes of reference. During the manufacturing process of the Howell static trip unit, the current transformers are calibrated by providing known values of current to the transformers and the transformer circuit is adjusted accordingly. During long term operation of the static trip unit, the transformer impedance may vary depending upon use and climatic conditions, such that the transformers may provide output currents which differ slightly from the original values at calibration.

To provide for exact determinations of the long time and short time pickup values, the timing resistors within the long term trip mode network and the short time trip mode network must be accurately trimmed by a laser trimming process which involves sophisticated equipment and skilled equipment operators. The same is true for trimming the resistors that are used within the voltage regulator portion of the trip unit power supply.

As common with many static trip units, semiconductor elements such as diodes and transistors are used as discrete elements along with the integrated circuit components within the signal processor boards. These semiconductor elements can be temperature variant and some means should be provided to compensate for seasonal variations in temperature.

It would be desirable to provide a correction factor for variations in the current transformer output over a wide range of operating currents and to calibrate the precision resistors required within the long time and short time trip mode networks as well as to incorporate a correction factor for the semiconductor components, both discrete and integrated, with no loss in manufacturing time and without requiring expensive calibration and trimming equipment.

The purpose of this invention is to provide such a calibration and correction facility to static trip units which insure accurate and precise readings throughout wide variations in the operating currents and/or seasonal temperatures throughout the operational life of the trip unit.

SUMMARY OF THE INVENTION

A circuit breaker static trip unit is provided with a digital processor, an A/D converter and an electrically alterable ROM for providing calibration facility and correction factor information to the current sensing transformers, timing resistors and semiconductor components used within the static trip unit. An AC current is passed through the current transformer primarily upon initial calibration to determine an average DC current on the rectifier secondary represented by a voltage. The voltage value is digitized and passed to the microprocessor by the A/D converter. The timing resistors are trimmed by measuring known values of the resistors and providing a digital correction value. Temperature calibration and correction factors are determined by providing constant current values to the static trip unit over two different temperatures and determining the correction factors for each temperature. The correction algorithms for the current transformers, timing resistors and semiconductor elements are embedded within the EAROM. The stored correction values and algorithms allow the static trip unit to provide extremely accurate performance throughout wide variations in current values over wide variations in temperature.

BRIEF DESCRIPTION OF THE DRAWINGS

FIG. 2 is a diagrammatic representation of the digital processor, A/D converter and EAROM of the invention connected to the current transformer, rectifier and burden resistor depicted within the circuit shown in FIG. 1;

FIG. 3 is a diagrammatic representation of the digital processor, D/A converter and EAROM of FIG. 1 connected through an amplifier and an A/D converter to a single diode and a constant current source; and FIG. 4 is a flow diagram depicting the calibration of the static trip unit after manufacture by subjection to a first and second chamber of different temperature values.

DESCRIPTION OF THE PREFERRED EMBODIMENT

Figure 1:
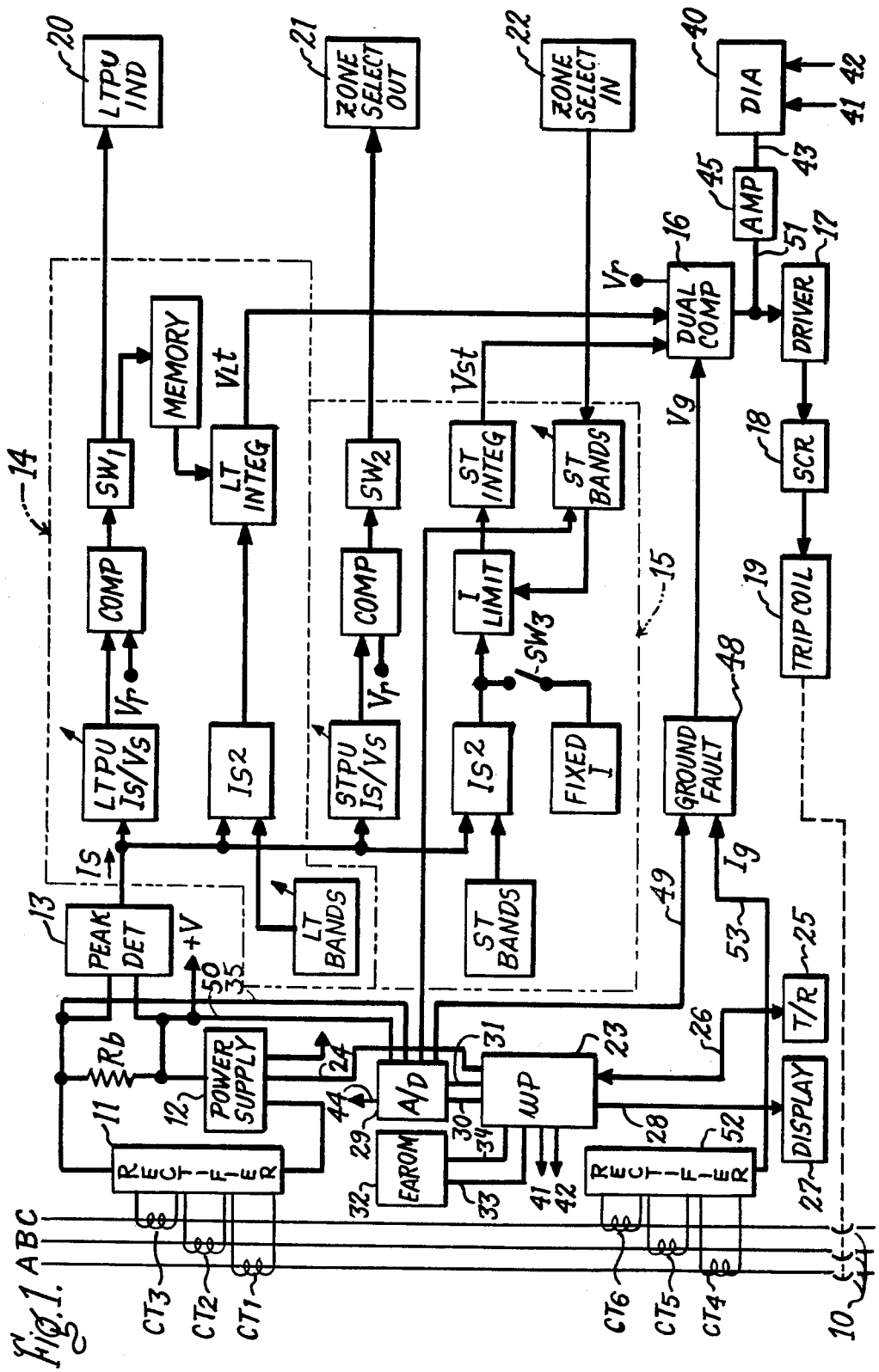
FIG. 1 is a diagrammatic representation of a known static trip unit circuit with the digital components added for providing the implementation according to the instant invention.

FIG. 1 contains a "hybrid" static trip unit wherein the long time trip mode network 14 and the short time trip mode network 15 comprise analog logic components for providing trip facility to the circuit interrupter and wherein a digital processor is employed for display and communication purposes.

The analog logic is similar to that described within the Howell patent and reference should be made thereto for a complete description of the circuit components and their functions. For the hybrid static trip unit of FIG. 1, current through contacts 10 within three phases A, B, C of a protected power line is sensed by means of current transformers $CT_1$, $CT_2$, $CT_3$ whose output is rectified within rectifier 11, a representative voltage signal is generated across a burden resistor $R_b$ and the peak value is determined within a peak detector 13. As described within the Howell patent, the long time trip mode network 14 includes a long time pickup circuit, a comparator and a switch $SW_1$ in combination with a memory circuit, a long time band circuit, a squaring circuit, a long time integrator and a memory for providing a long time voltage to the dual comparator 16. The short time trip mode network 15 employs a short time pickup unit, a comparator, a switch $SW_2$ in combination with a short time band circuit, a current squaring circuit connected with a fixed current source through switch $SW_3$, a current limit circuit, short time integrator and short time band circuit to produce a short time voltage to dual comparator 16. The long time pickup indicator 20, zone selector interlock output 21 and zone selector interlock input 22 are optional features which form no part of the instant invention. Upon comparing the long time voltage and the short time voltage to a reference $V_r$, the comparator 16 activates a driver circuit 17 and an SCR 18 for operating the trip coil 19 to open the contacts 10. When a microprocessor 23, such as an INTEL 8051, is employed for providing display information to display 27 over display line 28 and a transceiver 25, such as that described within U.S. patent application Ser. No. 561,481 filed Dec. 14, 1983, for communication with other microprocessors within similar hybrid static trip units over communication line 26, calibration and correction facility can also be provided in the following manner. The power supply 12 which receives input power via current transformers $CT_1$-$CT_3$ also provides operating power to the microprocessor 23 by means of line 24. An A/D converter 29 is connected across the burden resistor $R_b$ by means of lines 35, 50 and to the microprocessor by means of a pair of lines 30, 31. An electrically alterable ROM (EAROM) 32, which is also described as a non-volatile random-access memory (NOVRAM) supplied by Xicor, Inc. of Milpitas, Calif., is also connected to a separate microprocessor port via lines 33, 34. The combination of an EAROM with a D/A converter produces various analog outputs in response to addresses on the EAROM address lines. A good description of the makeup and function of the NOVRAM is found in the May 26, 1983 edition of Machine Design Magazine at page 47 entitled "Trimming Circuits Electronically", and reference should be made to this article for a detailed description thereof.

When a static trip circuit interrupter utilizes a digital processor for determining time over current conditions such as described, for example, within U.S. Pat. No. 4,432,031 to W. J. Premerlani, the digital processor could also be employed in combination with the EAROM to provide the calibration and correction facility to the aforementioned circuit components of the trip unit. The Premerlani patent is incorporated herein for purposes of reference and should be referred to for a good description of time over current protection algorithms.

For purposes of this disclosure, the active components of the circuit interrupter include those components that change or alter the nature, magnitude or duration of the applied current or voltage signals. Examples of such active components include the current transformers, diodes and transistors either singularly or in combination with each other within the interrupter circuit. The "passive" components are those which neither alter the nature, magnitude or duration of the applied current or voltage signals. Examples of such passive components include the resistor and capacitors used within the interrupter circuit. The invention is directed to calibrating and providing correction factors and/or temperature or other environmental compensation factors (e.g., pressure) for the active components while calibrating and trimming the passive components within the interrupter circuit.

The correction factor for one of the current transformers, such as $CT_1$, is determined within the simplified circuit shown in FIG. 2 in the following manner. To determine the span set or gain for the current transformer, an AC current I is passed through the current transformer through rectifier 11 to the burden resistor $R_b$. C is a filter capacitor placed across the burden resistor $R_b$. The average DC current value is represented by the voltage V across the burden resistor. This value is digitized and passed through the A/D converter 29 to the microprocessor 23. For a correction factor determination, when the tolerance for the current transformer $CT_1$ and the burden resistor $R_b$ is ±5%, the unadjusted tolerance is as high as ±10%. In order to adjust the tolerance, the following program steps are performed by the microprocessor. The current I is adjusted to a full scale current value and a test enable signal is applied on the test enable line 37 to the microprocessor 23. The microprocessor then reads the full scale value and calculates and stores a correction factor which is used as a multiplier to correct all the A/D readings. Although not shown in the drawings, a multiplexer and sample and hold amplifier can be connected between the analog circuit components and the A/D converter 29 when a plurality of individual components are employed within the trip unit circuit and each of the components requires adjustments for tolerance, correction or calibration. The correction factor D for the current transformer is equal to 256 divided by the full scale voltage reading V, in FIG. 2, appearing across the burden resistor and the inputs $IN_1$, $IN_2$ to the A/D converter 29. The 256 value is selected for an 8-bit number into the microprocessor 23 for storage within the EAROM 32. Other applications may use different full-scale ranges for finer (16 bit→65536) or coarser (4 bit→16) resolution. This simple correction assumes that the worse case A/D input voltage (maximum) is less than the specified full-scale A/D input. The difference in resolution for the worst case input voltage is +0.45% versus ±0.39% for an 8-bit A/D converter.

FIG. 3 shows a circuit arrangement for setting the gain and zero adjustment of a characteristic signal diode $D_1$, for example, used as a temperature sensor within the long time trip mode network 14 and short time trip mode network 15 of FIG. 1. The gain adjustment is required to eliminate component tolerance problems and diode temperature coefficient variations. The offset adjustment eliminates the absolute voltage variation. For the circuit of FIG. 3, a constant current source of 5 milliamps is transmitted through the diode $D_1$ to ground. A high gain amplifier 45 with a current limiting resistor $R_1$ connected via line 51 to its negative input and with its positive input connected to ground through a current limiting resistor $R_3$ is provided with the same 5 milliampere current and produces an inverting gain. The feedback resistor $R_2$ is connected between the output of the amplifier and its negative input. The output of the amplifier is transmitted over line 44 to the A/D converter 29 through a pair of lines 30, 31 to the microprocessor 23. An offset adjustment value is provided by the microprocessor over lines 41, 42 through a D/A converter 40 as shown in FIG. 1. $D_1$ is shown as one example of a signal diode having a linear voltage temperature coefficient at constant current. It is understood that a plurality of such diodes and other semiconductor elements may be used within the trip unit depicted in FIG. 1. To provide temperature compensation for all the active and passive components within the trip unit circuit of FIG. 1, the D/A converter 40 and high gain amplifier 45 are connected to the output of the dual comparator 16. The voltage source for providing the constant current of 5 milliamps can be applied to the $V_r$ terminal during the initial gain and zero selected for the point of adjustment since all the active components within the trip unit circuit are in the path of the current $I_s$ through both the long time trip mode network 14 and short time trip mode network 15. The ground fault circuit components within ground fault circuit 48 can be adjusted in a similar manner. The ground fault transformers $CT_4$-$CT_6$ which connect with the ground fault circuit 48 through a separate rectifier 52 and line 53 can be calibrated and adjusted in the same manner as described for the phase transformers $CT_1$-$CT_3$ is so desired.

To provide temperature compensation facility to the semiconductive elements, the trip unit after fabrication is brought to equilibrium at a temperature of 95° F. within a first test chamber 46 as shown in the product flow diagram depicted in FIG. 4. After the trip unit reaches an equilibrium temperature of 95° F., the test enable lines 38, 39 to the microprocessor 23 shown in FIG. 3 are enabled. A software program within the microprocessor would then perform the following functions.

(1) Read the temperature and adjust the D/A level;
(2) Repeat times "n" (where "n" is the number of bits in the D/A converter 40);
(3) Save the final D/A level in the EAROM 32.

The trip unit is then moved into the second test chamber 47 wherein the equilibrium temperature is adjusted to 45° F. The microprocessor implements the same steps at the second temperature as described earlier for the first temperature.

During the zero and gain ajustments made at the factory, a more powerful computer may be necessary when calculating multivariable or curvilinear regression coefficients that may be desired for correcting non-linear or multivariable measurements. The embedded software in the microprocessor 23 would only need to store and retrieve these correction values in operation.

Although sensor output correction circuits, such as that described within U.S. Pat. No. 4,303,984 to Felix J. Houvig and digital error correcting trimming in an analog to digital converter such as described in U.S. Pat. No. 4,335,371 to Joseph J. Connolly et al are known, it is believed that calibration and correction facilities within static trip units has never heretofore been employed.

In the aforementioned patent to Howell, wherein a plurality of optional features are provided such as long time pickup indication, zone selective interlock, as well as ground fault protection, for example, these functions are selectable by the customer and modifications must be made to the trip unit to supply the customer with only those selected options. For the Howell static trip unit, the selection is achieved by means of jumper connections within various locations in the static trip unit portion of the circuit depicted in FIG. 1. The breaker rating, which specifies the maximum continuous current allowed through the protected circuit, is determined by selecting the appropriate value for the burden resistor $R_b$. It has been determined, by the use of the A/D converter 29, the EAROM 32 and the microprocessor 23 added to the Howell circuit shown in FIG. 1, that a particular program within the EAROM 32 can be employed to select certain of the aforementioned options. The microprocessor 23 would then only perform the functions represented by particular bits within the EAROM memory which could be set either by the manufacturer during the manufacturing process or by the user at the place of installation. The information provided from the peak detector 13 over line 35 to the A/D converter 29 could, for example, provide selectable voltage values for the burden resistor $R_b$ which could be stored in the EAROM 32 for any particular circuit breaker rating. A ground fault circuit 48 providing a ground voltage $V_G$ to the dual comparator 16 as one example could be connected with the A/D converter 29 over line 49 and if such a function is selected, the appropriate bit in EAROM 32 would so inform the microprocessor 23 and the ground fault line 49 would be accordingly activated.

It is thus seen that a static trip unit adapted for display and communication functions by means of a data processor, such as the microprocessor 23, can provide facility for calibrating and correcting the sensing components as well as providing correction factors for tolerance and temperature independence for the semiconductor components. By selecting the proper software within the EAROM 32, the various options for the trip unit can be selected either by the manufacturer or by the customer, as well as the circuit breaker rating. A further potential feature of the invention is the ability for the customer at any time to independently activate the test enable lines 37-39 depicted in FIGS. 2 and 3 to provide for the calibration and correction routines at any time.

I claim:

1. A static trip circuit interrupter comprising:
separable contacts within a protected power distribution circuit;
sensing means within said system for determining magnitudes of current through said contacts;
interrupter means within said system for opening said contacts upon predetermined conditions of said current magnitudes and of time;
trip unit means, including electrically active and passive circuit components, for determining the occurrence of said predetermined conditions of current and time and for actuating said interruption means to open said contacts, said trip unit means further including electrically alterable memory means and a digital processor for providing calibration and correction facility to selected ones of said active and passive components.

2. The static trip circuit interrupter of claim 1 wherein said sensing means comprises a current transformer and wherein said current transformer is calibrated and a correction factor is provided within said electrically alterable memory means.

3. The static trip circuit interrupter of claim 1 wherein said trip unit means comprises analog logic means and wherein said trip unit means further includes an A/D converter connected with said analog logic means and said digital processor for providing digital implementation to said analog logic.

4. The static trip unit of claim 1 including display means for displaying said current magnitudes.

5. The static trip circuit interrupter of claim 1 further including a transceiver for providing communication between said digital processor and other digital processors connected within said distribution system.

6. The static trip circuit interrupter of claim 2 further including a burden resistor in circuit with said current transformer for determining a maximum value of continuous current allowed through said protected power distribution circuit for a given circuit interrupter rating.

7. The static trip circuit interrupter of claim 6 wherein a value for said burden resistor is determined from a program stored within said electrically alterable memory means.

8. The static trip circuit interrupter of claim 1 wherein said trip unit is capable of selecting a plurality of options and wherein said options are stored within said electrically alterable memory means.

9. The static trip circuit interrupter of claim 1 wherein said selected active components include transformers, transistors and diodes.

10. The static trip circuit interrupter of claim 1 wherein said selected passive components include resistors.

11. The static trip circuit interrupter of claim 10 wherein said resistors comprise timing resistors within long time trip mode networks within said trip unit.

12. The static trip circuit interrupter of claim 10 wherein said resistors comprise timing resistors within short time trip mode networks within said trip unit.

13. The static trip circuit interrupter of claim 1 further including a power supply connected with said sensing means for providing operating power to said trip unit.

14. The static trip circuit interrupter of claim 13 wherein said power supply includes a resistor, said resistor being calibrated by means of a program stored within said electrically alterable memory means.

15. The static trip circuit interrupter of claim 7 wherein said A/D converter is connected across said burden resistor by receiving an input voltage in proportion to current transport through said current transformer.

16. The static trip circuit interrupter of claim 1 further including a D/A converter connected with said trip unit and said digital processor for providing feedback voltage to said trip unit.

17. The static trip circuit interrupter of claim 16 including an amplifier connected between said D/A converter, said A/D converter and said trip unit for providing an inverting gain to said trip unit.

18. The static trip circuit interrupter of claim 1 wherein said options within said electrically alterable memory means are both factory and user selectable.

19. A method for providing calibration and automatic correction facility to static trip circuit interrupters comprising the steps of:

storing a correction program within memory means associated with a digital processor within a static trip unit;

providing a constant current to a current transformer connected with said trip unit for generating a voltage value across a burden resistor in circuit with said static trip unit; and storing a correction factor obtained from said voltage value within said memory means.

20. A method for providing calibration and automatic correction facility to a static trip circuit interrupter comprising the steps of:

storing a correction program within electrically alterable memory means associated with a digital processor within a static trip unit;

providing a predetermined current to electrically active circuit components contained within said static trip unit;

translating said predetermined current to corresponding digital data through an A/D converter to said digital processor;

translating feedback data from said digital processor through a D/A converter to an amplifier in circuit with said electrically active components; and adjusting said electrically alterable memory means in correspondence with said feedback data to provide a correction factor within said electrically alterable memory means for said electrically active circuit components.

21. The method of claim 20 including the steps of:

submitting said static trip unit to a first temperature when adjusting said electrically alterable memory means to obtain said correction factor at a first temperature; and submitting said static trip unit to a second temperature when adjusting said electrically alterable memory means to obtain said correction factor at a second temperature.

* * * * *